United States Patent
Griffith

(10) Patent No.: US 8,224,672 B1
(45) Date of Patent: Jul. 17, 2012

(54) ACTUARY-MANIPULABLE RATING MODEL AND SYSTEM

(75) Inventor: David Griffith, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 3283 days.

(21) Appl. No.: 09/775,019

(22) Filed: Feb. 1, 2001

(51) Int. Cl.
*G06Q 40/00* (2006.01)
(52) U.S. Cl. .......................................... 705/4
(58) Field of Classification Search ............... 705/1, 10, 705/37, 4, 7, 75, 36; 434/107; 706/25
See application file for complete search history.

(56) References Cited

U.S. PATENT DOCUMENTS

| | | | | |
|---|---|---|---|---|
| 6,186,793 B1 * | 2/2001 | Brubaker | | 434/107 |
| 2001/0023404 A1 * | 9/2001 | Ogawa et al. | | 705/4 |
| 2002/0046053 A1 * | 4/2002 | Hare et al. | | 705/1 |
| 2002/0046064 A1 * | 4/2002 | Maury et al. | | 705/4 |
| 2002/0099596 A1 * | 7/2002 | Geraghty | | 705/10 |
| 2002/0188484 A1 * | 12/2002 | Grover et al. | | 705/4 |
| 2003/0158759 A1 * | 8/2003 | Kannenberg | | 705/4 |

OTHER PUBLICATIONS

U.S. Appl. No. 60/206,007, filed May 2000, Maury, Hector.*

* cited by examiner

*Primary Examiner* — Gerald J. O'Connor
*Assistant Examiner* — Natalie A Pass

(57) ABSTRACT

Techniques have been developed whereby an actuary-manipulable rating model may be defined and transformed into executable form using automated techniques. By allowing business users to define, review and revise rating models using familiar methodologies and constructs (such as factor tables) and by providing an automated facility for transformation of the rating model into an efficient executable form, systems and techniques in accordance with some embodiments of the present invention facilitate rapid deployment and update of insurance product offerings.

20 Claims, 5 Drawing Sheets

| State\Age | 0 — 20 | 20 — 30 | 30 — 40 | Default |
|---|---|---|---|---|
| NJ | 1.1 | .96 | .85 | |
| NY | 1.05 | .85 | | .95 |
| CT | 1.2 | .96 | | |
| Default | 1.05 | .96 | | 1.0 |

FIG. 3

| AGE | 0 | 10 | 25 | 30 |
|---|---|---|---|---|
| VALUES | 3 | 5 | 6 | 7 |

FIG. 4

ACTUARY-MANIPULABLE RATING MODEL AND SYSTEM

BACKGROUND OF THE INVENTION

1. Field of the Invention

The invention relates to automated rating systems and, more particularly, to techniques for transforming a human manipulable rating model into an executable representation thereof for preparation of quotes.

2. Description of the Related Art

In the insurance industry, rating is a sequence of calculations that translates the level of coverage provided by a particular policy into a dollar amount for the policy's premium. Rating calculations are based on the probability of events occurring. Typically, actuaries define a calculation sequence using statistical methods and census data about a group of individuals, such as all the individuals eligible for a specific insurance plan. Underwriters then use the sequences to evaluate risk, determining the rate and level of coverage for a particular plan. Product managers for an insurance company might also use a calculation sequence to evaluate the effect of market conditions. In order to run a calculation sequence for a particular insurance plan such as group life, the calculations need to include variables (for example, number of retirees) and standard adjustments (a number representing factors such as mortality rates and claims data) determined by the actuaries. When taken together, the calculation sequence, the variables, and the factor tables (or tables of adjustments) make up a rating model. An insurance company will typically have a rating model for each line of insurance it offers.

Unfortunately, current computational techniques generally require a high-level of programming expertise for creation and maintenance of a given rating model. In part because of this requirement, conventional rating systems are often maintained by an information technology department based on coding requests from actuaries or other business users. Cycle times for preparation of quotes or other rating results based on a new or revised rating model can vary from days to weeks. Using conventional approaches, computational times can be substantial, even for an existing rating model. As a result, existing approaches are generally inadequate for real-time quotes.

SUMMARY OF THE INVENTION

Accordingly, techniques have been developed whereby an actuary-manipulable rating model may be defined and transformed into executable form using automated techniques. By allowing business users to define, review and revise rating models using familiar methodologies and constructs (such as factor tables) and by providing an automated facility for transformation of the rating model into an efficient executable form, systems and techniques in accordance with some embodiments of the present invention facilitate rapid deployment and update of insurance product offerings.

In some realizations, portable code technologies such as that provided by Java™-based environments (e.g., the Java programming language, Java compilers, and Java virtual machine execution environments) allow executable forms of a rating model in accordance with the present invention to execute on diverse systems ranging from mainframes to web servers to laptops to palm or handheld devices, all with consistent results. In some realizations, metadata encodings (such as those based on markup languages such as XML) facilitate definition of a rating model and transformation to executable form.

In some realizations, such rating models and automated transformation facilities may be employed to automate the underwriting process. In some realizations, binding level quotes may be provided to brokers, producers, third party systems or individual customers at speeds suitable for electronic commerce. For example, even life-by-life rating for large groups can be processed in a matter of seconds. Some realizations may advantageously separate carrier rates from factors and calculation methodologies of a given rating model.

BRIEF DESCRIPTION OF THE DRAWINGS

The present invention may be better understood, and its numerous objects, features, and advantages made apparent to those skilled in the art by referencing the accompanying drawings.

FIG. 3 illustrates a factor table.

FIG. 4 illustrates a factor table that incorporates an interpolation axis.

The use of the same reference symbols in different drawings indicates similar or identical items.

DESCRIPTION OF THE PREFERRED EMBODIMENT(S)

The description that follows presents a set of techniques, systems, encodings and functional sequences associated with transformation of an insurance calculation base defined in a form suitable for manipulation by business users, e.g., actuaries, underwriters product managers, etc., to an executable form suitable for use in rating, pricing or otherwise evaluating an insurance product as against a profile of an insured (or potential insured), a population or risk pool. While some of the examples employed focus on risk factors, characteristics, computational approaches typical of auto and group life insurance calculation bases, based on the description herein, persons of ordinary skill in the art will appreciate a wide range of applications including applications to other insurance and insurance-like financial products such as annuities, variable insurance products, etc. Accordingly, terminology particular to a particular insurance line is used merely for illustration and should not be taken as limiting. Similarly, uses of particular encodings, including eXtensible Markup Language (XML) encodings, and Java™ or object-oriented programming language constructs, are merely exemplary. In particular, the invention is not limited to any particular encodings, programming techniques or executable forms. Rather, based on the description herein, persons of ordinary skill in the art will appreciate a number of suitable variations. In some realizations, the illustrated techniques are used to supply an executable rating model component for integration with, and/ or invocation by, a user application or information service. In general, the techniques, systems, objects, functional sequences and data encodings described herein may be used in combination and/or integrated with applications and/or transaction processing systems.

In view of the above, and without limitation, the description that follows focuses on an exemplary environment in which insurance calculation bases are transformed to executable form. The description employs terminology particularly appropriate for certain insurance lines and software techniques. However, these and other embodiments will be appreciated by persons of ordinary skill in the art based on the description and may fall within the scope of the claims that follow.

Overview

Figure 1:
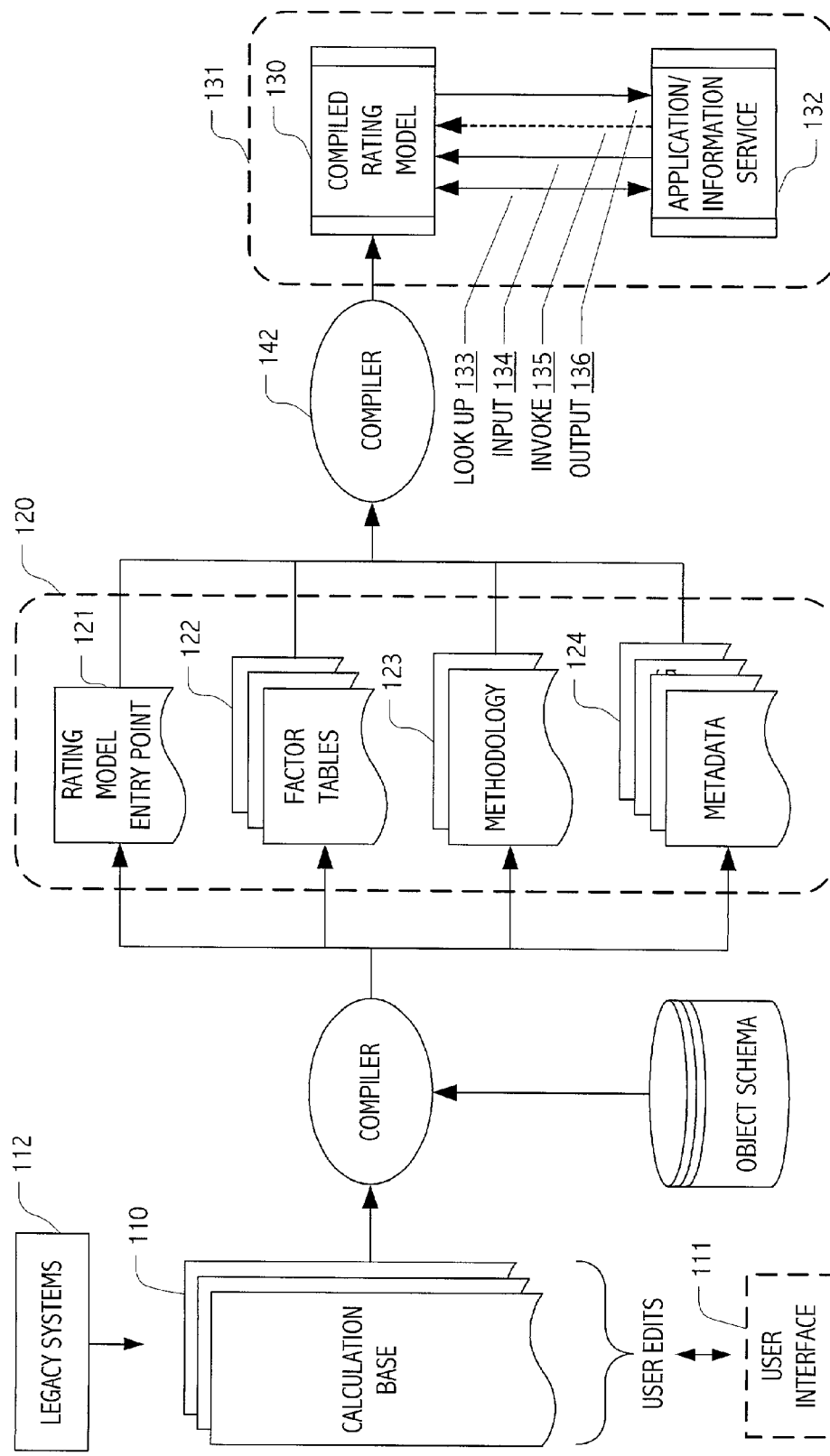
FIG. 1 depicts information flows associated with a two-step compilation of an actuary manipulable representation of a calculation base first, to an intermediate source form, then, to compiled rating model in accordance with some embodiments of the present invention.

FIG. 1 illustrates information flows associated with a two-step compilation of calculation base 110 first to an intermediate source form 120, then, to compiled rating model 130. Calculation base 110 is defined in a user-manipulable form. Typically, calculation base 110 is encoded in a source form that is itself readable and manipulable by an actuary, underwriter, product manager or other business user, although in some realizations a user interface (e.g., graphical user interface 111) allows such an actuary, underwriter, product manager or other business user to easily define and manipulate a calculation base irrespective of the underlying encoding thereof. Forms suitable for manipulation by business users, e.g., actuaries, underwriters, product managers, etc., are hereinafter referred to as actuary-manipulable forms without loss of generality. In some realizations in accordance with the present invention, calculation base 110 is represented in accordance with an eXtensible Markup Language (XML) encoding such as described in greater detail below.

Whatever the particular encoding form, calculation base 110 defines variables, adjustments (e.g., in the form of factor tables) and calculation sequences appropriate to a given rating model. In some realizations, components of calculation base 110 (particularly, pre-existing factor tables from legacy systems) may be imported or loaded into a representation of calculation base 110.

Compiler 141 transforms a representation of calculation base 110 from user- or actuary-manipulable form to an intermediate form such as objects, methods and interfaces defined in accordance with the Java™ programming language. See generally, Arnold & Gosling, *The Java™ Programming Language,* 1996 by Sun Microsystems, Inc. In the illustration of FIG. 1, intermediate source form 120 includes separate java source files encoding methodologies 123, factor tables 122, an entry point 121 and metadata and methods (e.g., metadata 124) descriptive of variables, factor tables and methodologies employed the rating model. In some realizations, compiler 141 may draw from object schema 143 for predefined objects, methods, data structures, interfaces, etc.

Compiler 142 transforms intermediate source form 120 to executable form as compiled rating model 130. The resulting compiled rating model 130 includes runtime data structures corresponding to variables and factor tables of the calculation base, initialization and access methods, and functional code (e.g., methodologies 123) corresponding to calculation sequences of the calculation base. In addition, compiled rating model 130 includes predefined input, output and calculate interfaces, as well as methods that allow for runtime lookup of identifiers for runtime instances corresponding to variables, factor tables, calculation sequences or methodologies, etc. Using these facilities (which are described in greater detail below), an application or information service 132 of an execution environment 131 obtains runtime identifiers for objects of the compiled rating model 130 (see lookup 133), sets values for certain objects (typically variables or overrides) using the input interface (see input 134), initiates a computation in accordance with the rating model using the calculate interface (see invoke 135), and retrieves results of the rating model computation (see output 136). In this way, an application such as quote generator, web server, etc. may employ a compiled rating model 130 corresponding to an actuary-manipulable calculation base without detailed knowledge of the internals thereof.

Typically, compiler 142 includes any commercially available Java compiler (such as the jvc compiler, available from Microsoft Corporation), although other configurations are also possible. Indeed, while the illustration of FIG. 1 and much of the description that follows presumes a two-step compilation (e.g., by compilers 141 and 142), some embodiments in accordance with the present invention may implement the techniques described herein without separate compilers. Similarly, other or additional steps, such as further compilation of machine independent Java byte codes to machine-specific object code, may be employed. In general, the two-step approach is presently preferred because it allows implementations to exploit the rich set of commercially-available tools for transforming Java source to executable form suitable for a wide variety of implementations ranging from mainframes to web servers to laptops to palm or handheld devices, all with consistent results.

While a Java-based intermediate form is presently preferred, persons of ordinary skill in the art will recognize, based on the description herein, a variety of suitable alternative intermediate forms. For example, other programming languages, scripting and execution environments (now or hereafter developed) may be employed. Nonetheless, the widespread adoption of the Java language, the general availability of tools, including compilers and execution environments (e.g., Java virtual machine implementations and Just In Time (JIT) compilers) makes Java an attractive implementation environment for the systems, techniques and program products described herein. Furthermore, the widespread adoption of the Java language makes Java-related terminology and object-oriented constructs a useful context for illustrating systems, constructs and techniques in accordance with the present invention. Accordingly, and without limitation, the description that follows presumes use of an XML-based encoding of an actuary-manipulable calculation base and Java-based intermediate source forms.

Building a Rating Model

Figure 2:
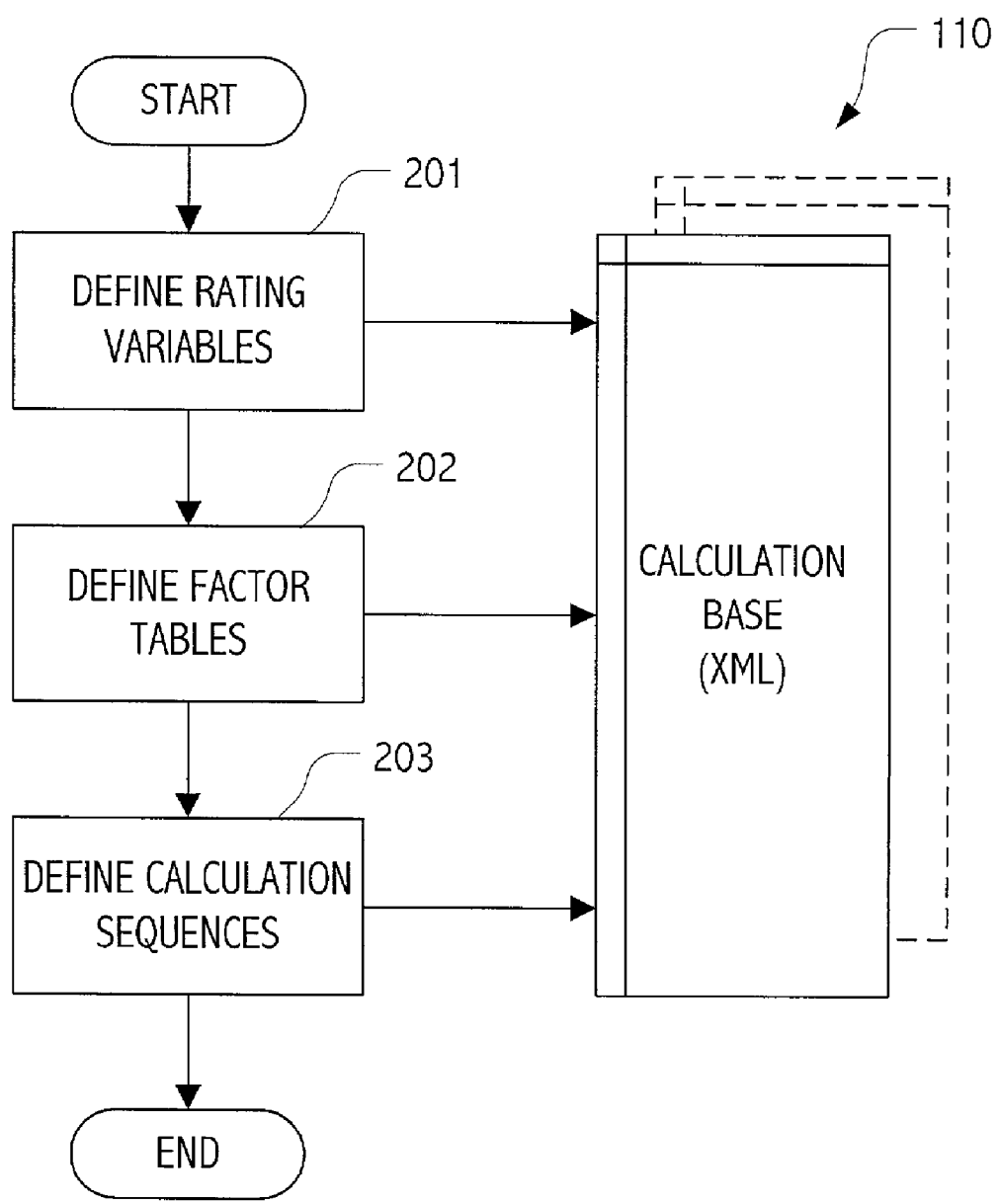
FIG. 2 depicts preparation of a calculation base in accordance with some embodiments of the present invention.

To build a particular rating model (e.g., for a specific company and insurance plan), we define a calculation base. In general, the calculation base includes variables, factor tables and calculation sequences, each encoded using XML. FIG. 2 illustrates preparation of a calculation base (e.g., XML encoded calculation base 110) in accordance with some embodiments of the present invention. In some realizations, a business user (e.g., an actuary, underwriter or product manager) defines rating variables, factor tables and calculation sequences using any of a variety of software environments, e.g., a text editor or a more specialize user interface, in which XML may be defined and/or maintained in accordance with syntax defined by relevant Data Type Definitions (DTDs). In a given implementation, a business user may be constrained to define rating variables, factor tables and calculation sequences in accordance with applicable DTDs. Alternatively, unconstrained definitions may be validated against the applicable DTDs. In general, editing and/or maintenance facilities are implementation dependent.

Typically, a calculation base is defined for each insurance product for which rating calculations are to be performed. For instance, if an insurer (or agent) sells long-term disability, short-term disability and group life insurance, three calculation bases could be defined. Alternatively, similarly situated insurance products, e.g., competing auto or life insurance products as offered on an online quote service, would typically be represented by separate product- and underwriter-specific calculation bases. In each case, an insurance product is defined using rating variables, factor tables and calculation sequences. In the description that follows, exemplary DTDs are used to specify suitable structural forms for definition of variables, factor tables and calculation sequences.

Rating Variables

Variables define the information used as values in rate calculations. One of the roles of rating variables is to specify the factors used in factor tables. In an exemplary realization, three types of rating variables are provided: discrete variables, continuous variables and date variables.

Discrete Variables: In one realization, discrete variables are defined and/or maintained (201) in accordance with the following DTD:

<!ELEMENT DISCRETE_VAR (DISCRETE_VAR*)>
<!ATTLIST DISCRETE_VAR
name CDATA #REQUIRED
comment CDATA " "
id CDATA " ">

In some implementations discrete variables allow an actuary to declare variables with multiple layers, defining children to form a tree structure. For example, it is possible to use discrete variables to form a table that includes states as the top layer, and New York and New Jersey as children. Other uses may exploit multiple inheritance.

The following is XML declaring discrete variables for retiree information from census data:

<!--Get Retiree info from census-->
<DISCRETE_VAR name="Status" id="Status">
<DISCRETE_VAR name="Retiree" comment="for Retiree Yes"
    id="Retiree"/>
<DISCRETE_VAR name="Active" comment="for Active Yes"
    id="Active"/>
</DISCRETE_VAR>
<!--Get Gender from census-->
<DISCRETE_VAR name="Gender" id="Gender">
<DISCRETE_VAR name="Male" comment="for Male" id="Male"/>
<DISCRETE_VAR name="Female" comment="for Female" id="Female"/>
</DISCRETE_VAR>

The following XML declares a discrete variable for gender. Gender has two child variables, male and female.

<DISCRETE_VARIABLE name="gender">
<DISCRETE_VAR name="M"/>
<DISCRETE_VAR name="F"/>
</DISCRETE_VARIABLE>

In general, such XML code defines variable that can be set on the input and used in calculation sequences (described below).

Continuous Variables: Continuous variables identify information in ranges such as salary or age. When defining a continuous variable in XML, an actuary need not specify a particular salary or age, for example, but instead identifies the piece of information to use in a calculation. In one realization, continuous variables are defined and/or maintained (201) in accordance with the following DTD:

<!ELEMENT CONTINUOUS_VAR EMPTY>
<!ATTLIST CONTINUOUS_VAR
name CDATA #REQUIRED
comment CDATA " "
id CDATA " ">

The following is XML declaring a continuous variable:

<!--Total Benefit Charges for all plans-->
<CONTINUOUS_VAR
name="TotalBenefitChargesForAllPlans"
id="TotalBenefitChargesForAllPlans"/>

This XML code defines a variable, TotalBenefitsCharges-ForAllPlans, which may be set on the input to a calculation and used in calculation sequences of the model.

Date Variables: Many calculations and adjustments used in calculating rates are date-dependent. For example, tables for tax adjustments vary by year. These variables are defined and/or maintained (201) in accordance with the following DTD:

<!ELEMENT DATE_VAR EMPTY>
<!ATTLIST DATE_VAR
name CDATA #REQUIRED
comment CDATA " "
id CDATA " ">

This sample XML declares a date variable.

<DATE_VAR name="birthdate" id="birthdate"/>

Factor Tables

A factor table is a multi-dimensional lookup table containing numerical adjustments. In general, a factor table can have any number of axes. However, two-dimensional factor tables (such as the factor table contents depicted in FIG. 3) are illustrative. Typically, an adjustment is a numerical value based on characteristics and probabilities. In the context of insurance, actuaries determine the number used for the adjustment and included in a factor table. A common type of calculation is to multiply the amount of coverage provided by a policy by an adjustment found in a factor table. For example, a factor table might include adjustments based on age ranges and states of residence as illustrated in FIG. 3.

In some encodings, a factor table may include empty cells. In such an instance, no value would be found upon execution of a calculation step that references an empty cell of the factor table. Accordingly, some encodings may specify a default value for that cell. For instance, in the illustration of FIG. 3, the cell representing 30 to 40 year olds in New York is empty. Accordingly, a calculation step that references the cell corresponding to 30 to 40 year New York residents would instead use the default value of 0.95. Defaults values are convenient for indicating a value for the average or standard case. In some implementations, code generated to implement a factor table may resolve to the most specific, or closest matching, default. For instance, code corresponding to the factor table illustrated in FIG. 3, would resolve to a default of 0.96 for 20 to 30 year olds in a state other than NJ, NY or CT rather than the less specific default of 1.0 for an otherwise unspecified ages and state index.

In an illustrative realization, factor tables have an associated name, start date (optional), end date (optional), list of axes and list of cell values. In general, a calculation base may have more than one factor table of the same name. The factor table to be used is determined at run time based on correspondence of effectivity dates (start and end dates).

Factor Table Axes

As illustrated in FIG. 2, factor tables are defined in XML using runtime values of previously defined variables, e.g., date, continuous, or discrete variables, to index axes of the factor table. In some implementations, interpolation may be used with continuous variable. In general, factor tables are defined and/or maintained (202) in accordance with the following DTD:

```
<!ELEMENT FACTOR_TABLE (START_DATE?, END_DATE?,
    (DISCRETE_AXIS|CONTINUOUS_AXIS|DATE_AXIS|
    INTERPOLATION_AXIS)+,
    (TABLE_CELL|CELL)*)>
    <!ATTLIST FACTOR_TABLE
    name CDATA #REQUIRED
    comment CDATA ""
    id CDATA "">
```

EXAMPLE 1

Discrete Axis

A discrete axis is defined and/or maintained (as part of factor table definition 202) in accordance with the following DTD:
<!ELEMENT DISCRETE_AXIS (DEFAULT_COLUMN?)>
  <!ATTLIST DISCRETE_AXIS
  variable CDATA #REQUIRED
  input_type CDATA " "
  depth (1|2) "1"
  id CDATA " ">
The following XML creates a portion of a table with one discrete axis:
<!--Basic Life Factor Tables-->
<FACTOR_TABLE name="ActCABFactor" id="ActNPCABFactor">
  <DISCRETE_AXIS id="ActCAB_State_Axis" variable="ContractState"/>
  <TABLE_CELL>
  <COLUMN column_id="AB"/>
  <CELL_VALUE value="0.3"/>
  </TABLE_CELL>
  <TABLE_CELL>
  <COLUMN column_id="AK"/>
  <CELL_VALUE value="0.3"/>
  </TABLE_CELL>
  <TABLE_CELL>
  <COLUMN column_id="AL"/>
  <CELL_VALUE value="0.3"/>
  </TABLE_CELL>

EXAMPLE 2

Continuous Axis

A continuous axis is defined and/or maintained (as part of factor table definition 202) in accordance with the following DTD:
<!ELEMENT CONTINUOUS_AXIS
  (AXIS_VARIABLE?, CONTINUOUS_COLUMN+, DEFAULT_COLUMN?)>
<!ATTLIST CONTINUOUS_AXIS
  name CDATA " "
  id CDATA " "
  overlaps_allowed (true|false) "false">
  <!ELEMENT CONTINUOUS_COLUMN (LOW?, HIGH?)>
    <!ATTLIST CONTINUOUS_COLUMN
    id CDATA #REQUIRED>

The following portion of a table includes a column of continuous variables:

```
<FACTOR_TABLE name="tblPricing" id="FemaleManualRate">
  <CONTINUOUS_AXIS id="FemaleAge_Axis">
    <AXIS_VARIABLE variable="Age"/>
    <CONTINUOUS_COLUMN id="FemaleAgeCol1">
      <LOW value="0"/>
      <HIGH value="1"/>.
    </CONTINUOUS_COLUMN>
    <CONTINUOUS_COLUMN id="FemaleAgeCol2">
      <LOW value="1"/>
      <HIGH value="2"/>
    </CONTINUOUS_COLUMN>
```

EXAMPLE 3

Date Axis

A date axis is defined and/or maintained (as part of factor table definition 202) in accordance with the following DTD:
<!ELEMENT DATE_AXIS
  (AXIS_VARIABLE?, DATE_COLUMN+, DEFAULT_COLUMN?)>
<!ATTLIST DATE_AXIS
  id CDATA " "
  overlaps_allowed (true|false) "false">
  <!ELEMENT DATE_COLUMN (START_DATE?, END_DATE?)>
    <!ATTLIST DATE_COLUMN
    id CDATA #REQUIRED>
The following XML creates a table with both date and discrete axes:
<DATE_VAR name="birthdate" id="birthdate">
  <DATE_AXIS id="BirthYear_Axis">
    <AXIS_VARIABLE variable="Year"/>
    <DATE_COLUMN id="BirthYearCol1">
      <LOW value="1931"/>
      <HIGH value="1940"/>
    </DATE_COLUMN>
    <DATE_COLUMN id="BirthYearCol2">
      <LOW value="1941"/>
      <HIGH value="1950"/>
    </DATE_COLUMN>>
    <DISCRETE_AXIS id="Cntract_State_Axis" variable="ContractState"/>
    <COLUMN column_id="TX" I>

EXAMPLE 4

Interpolation Axis

FIG. 4 illustrates a factor table that incorporates an interpolation axis. For example, if the person for whom you are looking up information is of age equal to 5, code generated to correspond to the illustrated factor table provides the value 4. Interpolation, extrapolation and other functionally defined lookup methods may be useful in some implementations. An interpolation axis is defined and/or maintained (as part of factor table definition 202) in accordance with the following DTD:
<!ELEMENT INTERPOLATION_AXIS
  (AXIS_VARIABLE?, INTERPOLATION_COLUMN+)>
<!ATTLIST INTERPOLATION_AXIS
  id CDATA " ">

```
<!ELEMENT INTERPOLATION_COLUMN EMPTY>
<!ATTLIST INTERPOLATION_COLUMN
    value CDATA #REQUIRED
    id CDATA #REQUIRED>
<!ELEMENT AXIS_VARIABLE EMPTY>
<!ATTLIST AXIS_VARIABLE
    variable CDATA #REQUIRED
    input_type CDATA " ">
<!ELEMENT DEFAULT_COLUMN EMPTY>
<!ATTLIST DEFAULT_COLUMN
    id CDATA " ">.
```

Calculation Sequences

A calculation sequence provides a flexible way to calculate rates based on specific information and statistical probability. As with variables and factor tables, a calculation sequence is defined using XML. In one realization, a calculation sequence includes the following elements: a name, a start date (optional), an end date (optional) and a list of calculation steps. In general, a calculation sequence may have more than one calculation step of the same name. The particular calculation step used at run time is based on correspondence of effectivity dates, if any.

In an exemplary implementation, a particular calculation sequence may employ any of the following seven types of steps.

1. Basic Step—This step has a set of adjustments, each containing a condition and a value.
2. Conditional Step—This step tests a condition, evaluating if it is true or false, and performs different steps based on the evaluation.
3. Methodology Call Step—This step, similar to a function call, specifies a methodology, which then performs its processing, returning a value to the calculation sequence.
4. Loop Step—This step moves through a series of child inputs aggregating the results of calculations performed on each child input. This step is used along with aggregation steps.
5. Aggregation Steps—Used along with loop steps, this step aggregates the results of calculations performed on child inputs. This may also be used with conditional steps to aggregate, for example, to add all the salaries of the men over 50 who appear as child inputs for a given policy.
6. Warning Step—This step tests a condition, and if the condition evaluates to true, the system can be made to stop processing and return an error message.
7. Bean Step—Relying on standard JavaBeans™ technology, this step enables you to exit a calculation, perform processing using a Java Bean class, and return a value for use in the next step.

As used herein a "step" is an element of a calculation sequence and, as will be understood from the description herein, may include aspects more often described as flow control elements (e.g., loop steps, methodology call steps, and bean steps), predicates (e.g., conditional steps) and operations (e.g., aggregation steps). A given calculation sequence need not employ all types of steps.

In an exemplary realization, the various types of calculation steps have common aspects or attributes. For example, each performs an operation on a value, typically, a value received from a previous step. Each provides a numeric result, which is typically used as the value for the next calculation step. In general, calculations may be nested by inserting a conditional step into a loop step. A more detailed description of these steps and their common elements follows.

Common Elements in Calculation Steps

In an exemplary representation, each calculation step includes the following elements or attributes:

1. Values—Each calculation step performs operations on a value. The value may come from a lookup table, or it might be a result from a calculation in the previous step. When a calculation is performed using an input value, it produces an output value for that calculation step.
2. Results—The final output value for a calculation step is called the result for that step. The result is typically used as the input value for the next calculation step.
3. Operators—There are 11 supported operators: +, −, *, /, exponent, remainder, minimum, maximum, percent increase, percent decrease, and override. An override indicates to the system that it should ignore the result of the previous step and use the value of the current step instead. The operators perform the calculation on an input value, returning a calculated value as a result. The result forms the basis of the calculation in the next step.
4. Rounding Modes—After using the specified operator on a designated value, the result is rounded in accordance with a specified rounding mode. For example, depending on the particulars of a rating model, it may be desirable to round up to two-place decimal result.
5. Output Flags—Output flags indicate whether the results for a step are visible on the output from the rating calculation. In general, if the result is an intermediate result, output may be disabled for that step to improve performance.
6. Names—Each calculation step requires a name As described above, a calculation sequence may include up to seven types of steps. A calculation step is defined and/or maintained (203) in accordance with the following DTD:

```
<!ELEMENT METHODOLOGY (START_DATE?, END_DATE?,
    (BASIC_STEP|METH_CALL_STEP|CONDITIONAL_STEP|LOOP_STEP|
    AGGREGATION_STEP|WARNING_STEP|BEAN_STEP)+)>
    <!ATTLIST METHODOLOGY
    name CDATA #REQUIRED
    comment CDATA " "
    input_type CDATA " "
    id CDATA " ">
```

The DTD for calculation steps lists the seven possible types of steps: basic, methodology call step, conditional step, loop step, aggregation step, warning step, or bean step. Each is now described in greater detail.

Basic Step

A basic step includes a set of adjustments, each having an associated condition and value pair. Conditions are tested (in order). If a condition is met, the corresponding value is evaluated. If the evaluation succeeds, the resulting value is used as the value of the basic step. If the condition does not hold or the evaluation of the value does not succeed, the next adjustment is tried. If no adjustment is found for which the respective condition holds and value evaluation succeeds, the result of the previous step is used unchanged as this step's result.

In general, a condition can be any predicate related to an input. For example, is an input variable equal to IL for Illinois? If it is, the condition evaluates to true and the implementing code resolved to the paired value. A basic step is defined and/or maintained (203) in accordance with the following DTD:

```
<!ELEMENT BASIC_STEP (START_DATE?, END_DATE?, ADJUSTMENT*)>
    <!ATTLIST BASIC_STEP
    name CDATA #REQUIRED
    comment CDATA " "
    operator
```

```
(OVERRIDE|PLUS|MINUS|TIMES|DIVIDE|EXP|
MIN|MAX|PERCENT_INC|PERCENT_DEC|REM)
"OVERRIDE"
    rounding_digits CDATA "0"
    rounding_mode
    (DO_NOT_ROUND|ROUND_UP|ROUND_DOWN|
ROUND_NEAREST|ROUND_NEAREST_
HALF|ROUND_NEAREST_QUARTER|ROUND_USE_
PREFS)
"DO_NOT_ROUND"
    output (true|false) "false"
    id CDATA " ">
<!ELEMENT ADJUSTMENT (CONDITION?, VALUE)>
```

The following example includes XML encoding a basic step defined (203) in accordance with the above DTD.

```
<METHODOLOGY name = "myMeth" input_type = "plan">
    some steps...
    <LOOP_STEP foreach = "person">
    ... some more steps at the person level...
        <BASIC_STEP>
            <ADJUSTMENT>
                <CONDITION>
                    <REQUIRED_VAR_TEST variable = "IL" input_type =
                        "plan"/>
                    <REQUIRED_VAR_TEST variable = "M" input_type =
                        "person"/>
                </CONDITION>
                <VALUE>
                    <CONTINOUS_VAR_LOOKUP variable = "salary"/>
                </VALUE>
            </ADJUSTMENT>
        </BASIC_STEP>
    </LOOP_STEP>
</METHODOLOGY>
```

Methodology Call Step

A methodology call step is similar to a function call in traditional programming languages. The methodology call step specifies a methodology to call, causing the calculation to switch to the chosen methodology. The value of the methodology call step is the value of the last step in the body of the selected methodology. A methodology call step is defined and/or maintained (203) in accordance with the following DTD:

```
<!ELEMENT   METH_CALL_STEP   (START_DATE?,
END_DATE?)>
    <!ATTLIST METH_CALL_STEP
    name CDATA #REQUIRED
    comment CDATA " "
    operator
    (OVERRIDE|PLUS|MINUS|TIMES|DIVIDE|EXP|
MIN|MAX|PERCENT_INC|PERCENT_DEC|REM)
"OVERRIDE"
    rounding_digits CDATA "0"
    rounding_mode
    (DO_NOT_ROUND|ROUND_UP|ROUND_DOWN|
ROUND_NEAREST|ROUND_NEAREST_HALF|
ROUND_NEAREST_QUARTER|ROUND_USE_PREFS)
"DO_NOT_ROUND"
    methodology CDATA #REQUIRED
    output (true|false) "false"
    id CDATA " ">.
```

Conditional Step

A conditional step is similar to an if-then-else construct in traditional programming languages. A condition is tested, and one or another sequence of steps is evaluated based on whether the condition is true or false. A conditional step is defined and/or maintained (203) in accordance with the following DTD:

```
<!ELEMENT CONDITIONAL_STEP (START_DATE?,
END_DATE?, CONDITION, IF_BRANCH?, ELSE_
BRANCH?)>
    <!ATTLIST CONDITIONAL_STEP
    name CDATA #REQUIRED
    comment CDATA " "
    operator
    (OVERRIDE|PLUS|MINUS|TIMES|DIVIDE|EXP|
MIN|MAX|PERCENT_INC|PERCENT_DEC|REM)
"OVERRIDE"
    rounding_digits CDATA "0"
    rounding_mode
    (DO_NOT_ROUND|ROUND_UP|ROUND_DOWN|
ROUND_NEAREST|ROUND_NEAREST_HALF|
ROUND_NEAREST_QUARTER|ROUND_USE_PREFS)
"DO_NOT_ROUND"
    output (true|false) "false"
    id CDATA " ">
<!ELEMENT IF_BRANCH
    (BASIC_STEP|METH_CALL_STEP|CONDITIONAL_
STEP|LOOP_STEP|AGGREGATION_STEP|WARNING_
STEP|BEAN_STEP)*>
<!ELEMENT ELSE_BRANCH
    (BASIC_STEP|METH_CALL_STEP|CONDITIONAL_
STEP|LOOP_STEP|AGGREGATION_STEP|WARNING_
STEP|BEAN_STEP)*>
```

Loop Step

Loop steps move through the child inputs of the top-level input and perform aggregations on the results. For example, if you have a hierarchy that represents a group life insurance policy, you may have children attached to it for each member of the policy. The loop step allows a calculation sequence to perform a sequence of steps on each child. The value of the group is the aggregate of last step results for each child. The results are aggregated according to the selected operator for the loop, such as sum, product, min or max. Conditional looping (for example, consider all of the women over 30 who smoke) is achieved by combining loop steps and conditional steps. In some realizations, loops may be declared as multithreaded. If so, then rather than iterating sequentially over the children, a fixed number of threads will be spawned and the children divided among them. This process enables support for symmetric multi-processor systems.

In general, a loop step is defined and/or maintained (203) in accordance with the following DTD:

```
<!ELEMENT LOOP_STEP
    (START_DATE?, END_DATE?, (BASIC_STEP|METH_
CALL_STEP|CONDITIONAL_STEP|LOOP_STEP|
AGGREGATION_STEP|WARNING_STEP|BEAN_
STEP)*)>
    <!ATTLIST LOOP_STEP
    name CDATA #REQUIRED
    comment CDATA " "
    operator
    (OVERRIDE|PLUSMINUS|TIMES|DIVIDE|
EXP|MIN| MAX|PERCENT_INC|PERCENT_DEC|REM)
"OVERRIDE"
    aggregation_operator
        (SUM|PRODUCT|MIN|MAX|COUNT|AVERAGE)
"SUM" for each CDATA *REQUIRED
    multithreaded (true|false) "false".
    num_threads CDATA "1"
    rounding_digits CDATA "0"
    rounding_mode
```

(DO_NOT_ROUND|ROUND_UP|ROUND_DOWN|
ROUND_NEAREST|ROUND_NEAREST_HALF|
ROUND_NEAREST_QUARTER|ROUND_USE_PREFS)
"DO_NOT_ROUND"
    output (true|false) "false"
    input_type CDATA " "
    id CDATA " ">

Aggregation Step

Aggregation steps may be defined in conjunction with loop steps to combine the results of calculations for a series of child inputs, for example all of the participants in a policy. This process is most useful in conjunction with conditional steps. For example, a calculation sequence may use an aggregation step to aggregate the sum of all the salaries for men over 50. An aggregation step is defined and/or maintained (203) in accordance with the following DTD:

```
<!ELEMENT AGGREGATION_STEP
    (START_DATE?,END_DATE?,(GROUP_BY)*)>
    <!ATTLIST AGGREGATION_STEP
        name CDATA #REQUIRED
        comment CDATA ""
        operator
            (OVERRIDE|PLUS|MINUS|TIMES|DIVIDE|EXP|MIN|MAX|
        PERCENT_INC|PERCENT_DEC|REM) "OVERRIDE"
            aggregation_operator
                (SUM|PRODUCT|MIN|MAX|COUNT|AVERAGE) "SUM"
            target IDREF #REQUIRED
            loop_target IDREF #REQUIRED
            rounding_digits CDATA "0"
            rounding_mode
    (DO_NOT_ROUND|ROUND_UP|ROUND_DOWN|
    ROUND_NEAREST|ROUND_NEAREST_HALF|
    ROUND_NEAREST_QUARTER|ROUND_USE_PREFS)
    "DO_NOT_ROUND"
        output (true|false) "false"
        id CDATA "">
    <!ELEMENT GROUP_BY EMPTY >
    <!ATTLIST GROUP_BY
        input_type CDATA #REQUIRED>
```

Warning Step

A warning step is similar to an exit construct in some programming languages, such as C or C++. When a calculation reaches an exit step, it has a condition that is tested. If the invert_condition flag is true and the condition holds, then an executing rating model stops the calculation and returns an error message. If the invert_condition is set to false, the rating model stops the calculation if the condition fails. Warning steps may be used for validation and support of automated underwriting. To use warning steps for automated underwriting, it is desirable to provide for automatic approval if no warnings are generated. A warning step is defined and/or maintained (203) in accordance with the following DTD:
<!ELEMENT WARNING_STEP (START_DATE?, END_DATE?, CONDITION)>
<!ATTLIST WARNING_STEP
  name CDATA #REQUIRED
  comment CDATA " "
  operator
    (OVERRIDE|PLUS|MINUS|TIMES|DIVIDE|EXP|
MIN|MAX|PERCENT_INC|PERCENT_DEC|REM)
"OVERRIDE"
  rounding_digits CDATA "0"
  rounding_mode
    (DO_NOT_ROUND|ROUND_UP|ROUND_DOWN|
ROUND_NEAREST|ROUND_NEAREST_HALF|
ROUND_NEAREST_QUARTER|ROUND_USE_PREFS)
"DO_NOT_ROUND"
  message CDATA " "
  severity CDATA "0"
  code CDATA "0"
  output (true|false) "false"
  invert_condition (true|false) "false"
  is_fatal (true|false) "false"
  id CDATA " ">

Compiling a Rating Model

Operation of compiler 141 is now described with reference to FIGS. 5 and 6. In general, compiler design is well understood in the art, see generally, Appel, *Modern Compiler Implementation in C*, 1998 (describing lexical analysis, parsing techniques, semantic analysis, control flow analysis, register allocation, code generation techniques, etc.), and a description of conventional techniques for translating programming languages into executable code are not duplicated here. However, certain aspects of the design and operation of compiler 141 bear more detailed treatment.

Figure 5:
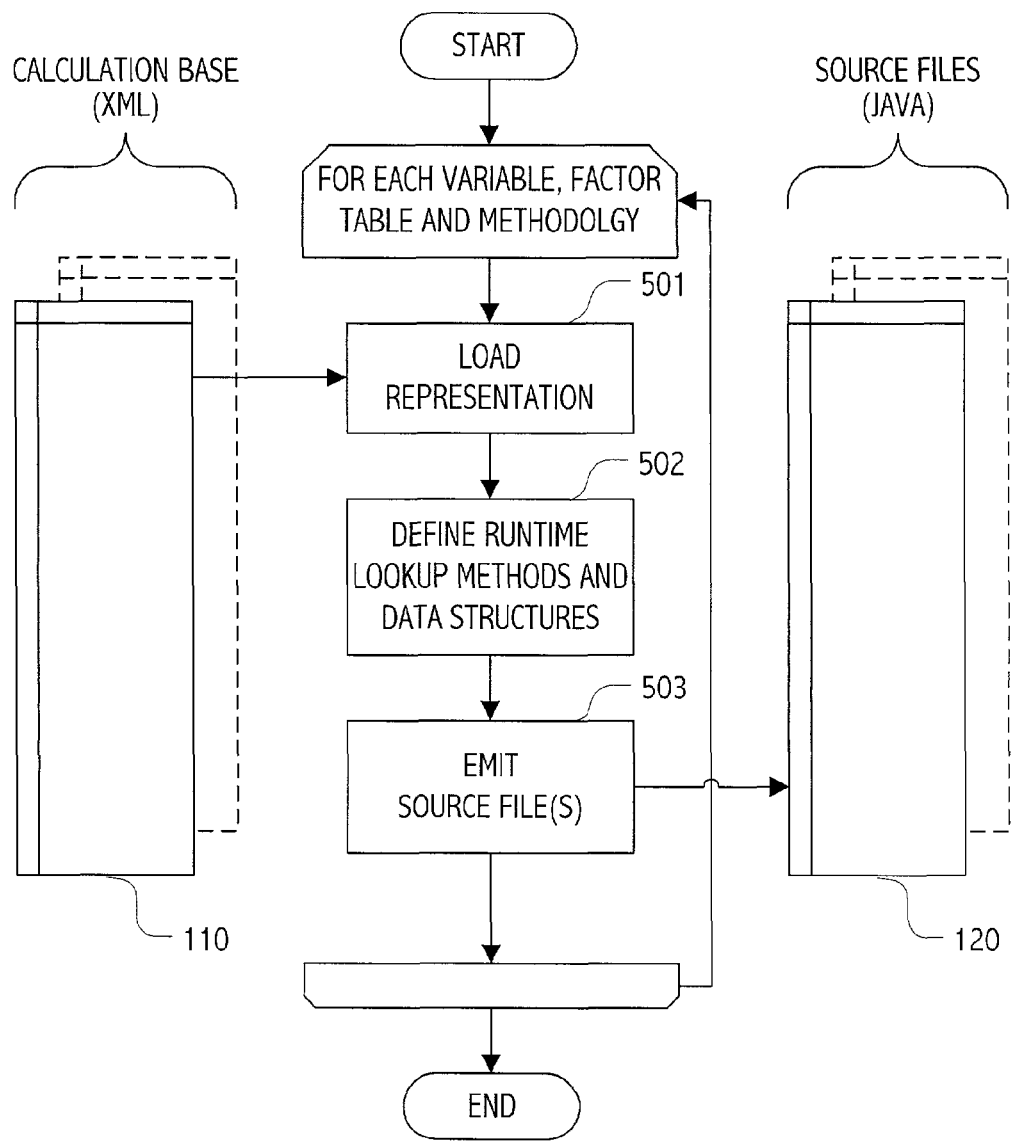
FIG. 5 depicts preparation, from a prepared calculation base, of source files encoding a rating model and including runtime lookup methods and data structures in accordance with some embodiments of the present invention.

In particular, FIG. 5 depicts preparation, from an XML-encoded calculation base, of Java™ source files encoding a corresponding rating model and including runtime lookup methods and data structures in accordance with some embodiments of the present invention. In general, for each variable, factor table and methodology defined by calculation base 110, the corresponding XML representation is loaded (501) into memory. Compiler 141 associates an integer identifier with each variable, factor table and methodology. In addition, compiler 141 emits a Java source file implementing methods for runtime lookup of information about the variables, factor tables and methodologies and making such metadata available to client code.

Generation of Intermediate Source Files for Variables

In general, metadata source files (e.g., metadata lookup source files 124) are emitted for each type of rating variable (e.g., discrete, continuous and data variables), for each factor table and for each methodology of the calculation base. Such metadata source files typically include one or more Java classes. The functionality implemented by such classes includes methods for obtaining the unique id associated with each variable, factor table and methodology (e.g., based on name lookup), methods for obtaining the name for a variable, factor table or methodology given it's unique id, and methods for returning an enumeration of variables, factor tables or methodologies defined by the calculation base.

The following metadata source, defined (502) by compiler 141 for continuous variables based on an exemplary calculation base, is illustrative.

```
import java.util.*;
public final class ExampleContVarMeta implements
    java.io.Serializable
{
    private static final Hashtable contVarTable =
        new Hashtable( );
    private static final Hashtable contVarNameTable =
        new Hashtable( );
    static private class Names0{
        static final String names[ ] = {
            "Age", "lowAge", "hiAge", "EarningsFactor",
            "BasicAmt", "CaseFlatAmt", "CommissionFlatPct",
            "CommissionFlatAmt", "Salary", "MAX", "MIN",
            "SIC_code", "VolumeBasedOnSalary",
            "StateAllocationFactor"};
    };
    static private class Unids0{
        static final int unids[ ] = {
            0, 1, 2, 3, 4, 5, 6, 7, 8, 9, 10, 11, 12, 13};
    };
```

-continued

```
    private static final int unids[ ] = new int[14];
    static
    {
        for(int i = 0;i<Names0.names.length; i++)
        {
            contVarTable.put(Names0.names[i],
                new Integer(Unids0.unids[i]));
            contVarNameTable.put(new
                Integer(Unids0.unids[i]),Names0.names[i]);
        }
        System.arraycopy(Unids0.unids, 0, unids,
            0*1000,Unids0.unids.length );
    }
    public static int getUNIDForContinuousVariable(String
        var)
    {
        Integer val = (Integer)contVarTable.get(var);
        return ((val==null)?-1:val.intValue( ));
    }
    public static String getContinuousVariableForUNID(int
        UNID)
    {
        return (String)contVarNameTable.get(new
            Integer(UNID));
    }
    public static int[ ] getContinuousVariableUNIDS( )
    {
        int out[ ] = new int[unids.length];
        System.arraycopy(unids, 0, out, 0, out.length);
        return out;
    }
}
```

Metadata source defined (502) for date variables and discrete variables are of similar form. However, in the case of discrete variables, the metadata source further includes methods for returning a list of top-level discrete variable identifiers, for determine the child discrete variables for a given parent discrete variable, and for determining the parent discrete variable for a given child discrete variable. The metadata source, defined (502) by compiler 141 for discrete variables based on an exemplary calculation base, and included as Appendix A is illustrative.

Generation of Intermediate Source Files for Factor Tables

Definition (502) of Java source for factor tables is similar. In addition to the objects and lookup methods illustrated above, the metadata source for factor tables further includes methods for returning the effective start date and end date of a given factor table. In addition, for each factor table, compiler 141 generates Java source representing the contents of the factor table. These contents are represented as one or more Java array structures, in row major order. Factor table cells that are empty are represented with a reserved, sentinel value. The following Java source, defined (502) by compiler 141 for a particular factor table based on an exemplary calculation base, is illustrative.

```
    import java.util.Hashtable;
    public class ExampleTable0 implements
    com.trilogy.fs.ice.runtime.ITableLookup
    {
        public double lookup(String filename, Hashtable
            fileHandles, int offset){ return contents[offset];}
        static final public double contents[ ] = new double[22];
        public static class Contents0{
            public static final double contents[ ] = { 0.0,
                1001.0, 5001.0, 10001.0, 15001.0, 20001.0,
                25001.0, 30001.0, 50001.0, 60001.0, 70001.0,
                75001.0, 100001.0, 150001.0, 200001.0, 250001.0,
                500001.0, 750001.0, 1000001.0, 2000001.0,
                1.0000001E7, 2.0000001E7
```

-continued

```
            };
        };
        static
        {
            System.arraycopy(Contents0.contents, 0, contents,
                0*1000,Contents0.contents.length );
        }
    }
```

Finally, compiler 141 defines a Java source file for each of the continuous or date axes of a particular factor table. In general, such source files implement a binary search over the range of values implemented by the corresponding axis and map from continuous or date values to a proper offset into storage implementing the corresponding factor table. Persons of ordinary skill in the art will appreciate a variety of suitable methods for calculating proper storage offsets. Compiler 141 implements any such suitable method.

Generation of Intermediate Source Files for Methodologies

Compiler 141 defines a Java source file implementing methods for runtime lookup of information about the methodologies and making such metadata available to client code. The functionality implemented includes methods for obtaining the unique id associated with each methodology (e.g., based on name lookup), for obtaining the name for a methodology given it's unique id, for returning an enumeration of methodologies defined by the calculation base, and for returning the effective start date and end date of a given methodology.

For each methodology, compiler 141 emits a Java source file representing the logic of the methodology. In some realizations, a pair of Java source files is emitted. One of these files includes the logic of the methodology including logging and run-time overrides, while the other includes the logic without those features enabled. The main class of either file includes a method, runMeth, which includes setup code to initialize the state of the calculation and code generated for the top-level layer of the methodology (see below).

Figure 6:
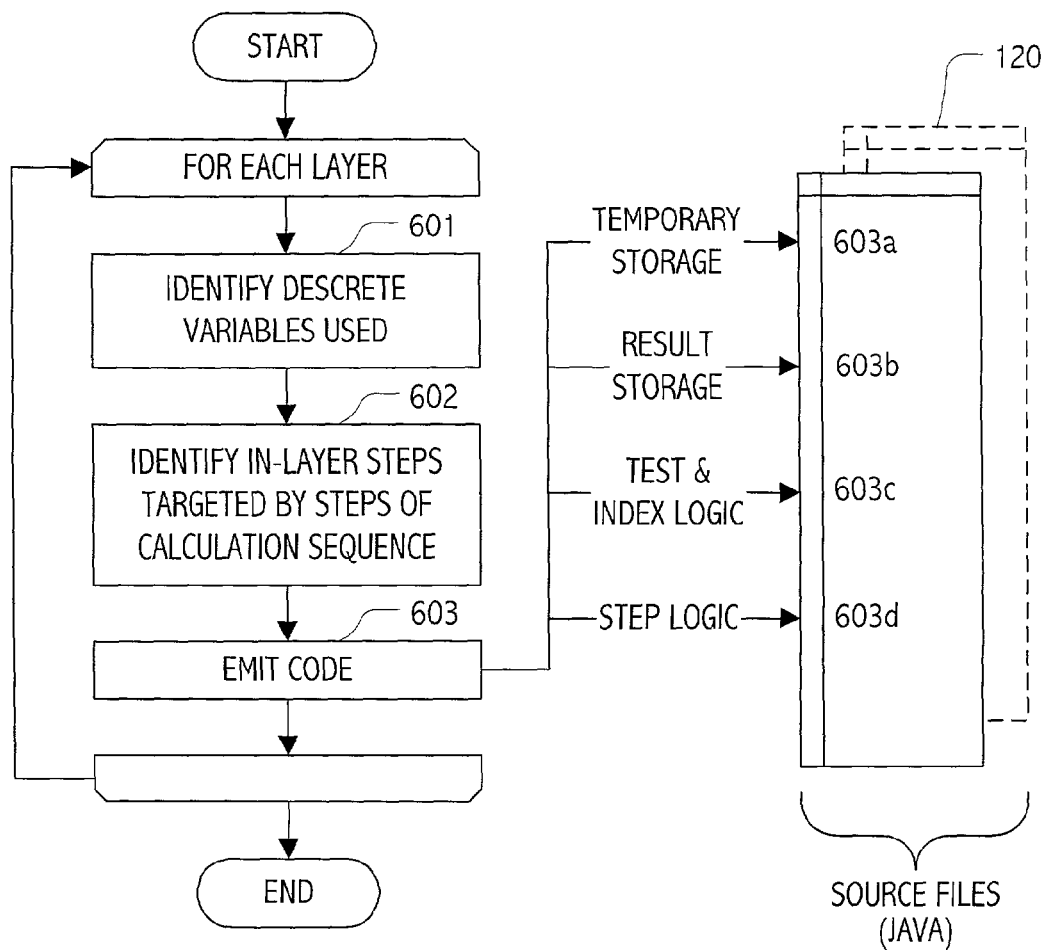
FIG. 6 depicts preparation of code for storage allocation and logic corresponding to individual flow control layers files of a rating model in accordance with some embodiments of the present invention.

FIG. 6 depicts preparation of code for storage allocation and logic corresponding to methodologies of a rating model in accordance with some embodiments of the present invention. First, compiler 141 splits the set of calculation steps in a given methodology into "layers". Each loop step (see above description of loop steps) implies a layer that includes the set of steps contained in the body of the loop step. Any steps in the methodology not in the body of a loop step are treated as a top-level layer of the methodology. Layers are useful because the steps in a given layer will act upon the same node of the input tree at runtime. Accordingly, the efficiency of code generation can be enhanced by aggregating the steps of a layer.

Analysis per Methodology

For each layer of a methodology, compiler 141 traverses the methodology and identifies (601) the set of discrete variables used for an input node associated with that layer. These discrete variables include those used by the calculation steps of the layer (or in a sublayer thereof) for Boolean tests or as indices for discrete axis lookups into factor tables. In this way, discrete variables on the input node need only be examined once, and all relevant tests and lookups can be performed in a single pass of the emitted code.

For each layer of a methodology, compiler 141 traverses the methodology to identify (602) the calculation steps in that layer that are targeted by other steps in the model. This is done so that the results of those steps can be extracted to a shared per-layer storage area. The steps may be targeted within the layer or in any sublayer. For each non-top-level layer of a methodology, compiler 141 traverses the methodology to identify (602) the calculation steps in that layer that are targeted for aggregation by other steps in the model. This is done so that aggregation storage areas may be efficiently managed.

Code Generation Per layer

Compiler 141 emits code (603a) for the temporary Java variables for each layer. In general, each layer needs a variety of temporary holding variables to store its transient information. Temporary variables may include the value of the current step, the result of the current step, the result of the current step after rounding, the success of the current step, and others.

Using the results of the per methodology analysis described above, compiler 141 also emits code (603b) allocating storage for the results of the targeted steps in each layer. For all the steps identified as targeted (see analysis, above), compiler 141 emits code to allocate temporary storage for results. In addition, compiler 141 emits code (603) allocating storage and creating temporary aggregation buckets for all of the applicable aggregations identified for that layer (see analysis, above). One aggregator bucket is created for each aggregation. Compiler 141 also emits code (603c) for the discrete variable test and axis lookup calculations for the appropriate discrete variables for that layer (see analysis, above). When executed, the emitted code allocates storage space for all of the tests and axis lookups. Then, the emitted code loops over the discrete variables on the calculation input tree node for the layer and sets the values for the allocated storage space.

Code Generation Per Step

Compiler 141 also emits code (603d) corresponding the individual calculation steps of a methodology. In general, any of a variety code implementation are suitable and conventional code generation techniques may be employed is emit Java byte codes corresponding to value calculations, condition testing, flow control, arithmetic or logical operations, or rounding mode of a particular calculation step. In general, emitted code calculates the result of a given calculation step from the value of the calculation step (see description of calculations steps, above), the previous step's result, the success of the step and the rounding mode. The emitted code uses storage locations allocated as described above for inputs, results and aggregation results. If a step is targeted by some other step (see analysis, above), then compiler 141 emits code to store the result of that step in a previously allocated temporary holding variable. If a step is targeted for aggregation by some other step (see analysis, above), then compiler 141 emits code to add the result of that step the appropriate aggregator or aggregators (see code generation per layer, above). If a given calculation step includes an output flag, the emitted code includes code to write the step's value to output storage for access by client code via an output interface.

For the Java source file version of the methodology that includes logging and run-time override support, some additional code is emitted. For example, if overrides are supported, additional code is emitted to force the value of a calculation step or the result of a calculation step. Similarly, if logging is supported, additional code is emitted to generate log or trace information.

Generation of Entry Point

Finally, the compiler emits (603) a Java source file representing the model as a whole. There is one class implemented in the source file, which represents the model as a whole. This is the class with which client users of this model interact. Interactions with all of the other classes occur indirectly through the model class. The previously described lookup methods for variables, factor tables, and methodologies are actually called from this file, which forwards the calls to the appropriate "Meta.java" classes. Additionally, this source file implements the "Calculate" method, which sets up the initial environment on the calculation and then calls the appropriate methodology class file created as described above.

Using a Compiled Rating Model

As previously described, a calculation base is transformed from an actuary-manipulable form (e.g., XML) to an intermediate from (e.g., Java source). The intermediate form is compiled (e.g., using an ordinary java compiler) to an executable form that implements an interface called CompiledCalculationBase. This interface includes methods that can be used to run the calculation sequences in of the rating model. In general terms, when you use the rating model, you write Java code to derive a quotation from the data and calculations in the model. The code specifies the input to be used by the compiled rating model in running a calculation sequence (or methodology).

Accessing Variables and Methods

To access all of the variables and methodology steps in a compiled rating model (e.g., compiled rating model 130), unique integer ids, called UNIDs, are employed. As previously described, it is possible to retrieve the UNID for a particular variable or step by using the element's name and using the lookup methods generated by compiler 141.

UNIDs for Continuous and Date Variables

To retrieve the unique id for a continuous or a date variable, use the methods shown below, providing the name of the variables. The appropriate lookup method of the compiled rating model returns the UNID for the variable named. For example:

int getUNIDForContinuousVariable (String name);
int getUNIDForDateVariable (String name);

UNIDs for Discrete Variables

When retrieving unique ids for discrete variables, it is important to consider that they can have a hierarchical structure. Also two discrete variables may have the same name, distinguished by having different parents in the variable hierarchy. Therefore, the lookup methods of the compiled rating model provide a context-sensitive way of retrieving the UNID for a discrete variable. For example:

int getUNIDForDiscreteVariable (String name);
int getUNIDForDiscreteVariableWithParent (String name, integer parentUNID);

More particularly, context sensitive lookup will be understood based on the following example. First, assume that there is more than one discrete variable named MD defined by a given calculation base, so the following has an undefined answer:

int unidMD=getUNIDForDiscreteVariable ("MD");

For example, lookup methods may not resolve this variable in a calculation base that defines both states.MD (e.g., the state, Maryland) and jobs.MD (e.g., the occupation, Medical Doctor). In this case, a context sensitive version of the method is preferred. For example:

int unidStates=getUNIDForDiscreteVariable ("states");
int unidMaryland=getUNIDForDiscreteVariableWithParent ("MD", unidStates);
int unidJobs=getUNIDForDiscreteVariable ("jobs");
int unidDoctor=getUNIDForDiscreteVariableWithParent ("MD", unidJobs);

UNIDs for Calculation Steps

Calculation steps offer the same chance of ambiguity seen with discrete variables. For example, calculation steps in different methodologies might have the same name. To resolve this, the CompiledCalculationBase interface provides a second method, which takes into account the context of the methodology that includes the step. The following example shows the method for retrieving the context of a step:

int getUNIDForStep (String name);
int getUNIDForStepInMethodology (String stepName, String methName, Date calcDate);

Calculation Inputs and Outputs

To run quotes against a compiled rating model, two additional interfaces are employed, ICalculationInput and IcalculationOutput. Classes implementing each (e.g., SimpleCalculationInput and SimpleCalculationOutput) can be employed to define the values of input data, e.g., values for discrete, continuous and date rating variables of the calculation base and to retrieve values and results of calculation steps. Generation of lookup methods for rating variables and calculation steps is described above. Classes implementing input and output are used with the Calculate method of the compiled rating model to make a call to a rating model. A call to an exemplary compiled rating model, ExampleCalcBase, might look like the following CompiledCalculationBase base=new com.trilogy.example.ExampleCalcBase( );
ICalculationInput input=new SimpleCalculationInput( );
input.setDiscreteVariable (base.getUNIDForDiscreteVariable ("foo"));
ICalculationOutput output=new SimpleCalculationOutput( );
RuntimePreferences prefs=new RuntimePreferences( );
base.Calculate ("methodology name", input, output, prefs);

The output object for this call contains all of the values and results produced by running the methodology named methodology name against the input object. To get the output, query the compiled rating base as in the example below.

int stepUNID=base.getUNIDForStep ("FinalResult");
Double finalResult=output.getResultForStep (stepUNID);
Double finalValue=output.getValueForStep (stepUNID).

A Sample Quotation

Here is an example of running a quote against a rating model.

1. Instantiate the base.
   CompiledCalculationBase base=new MyCalculationBase( );
   Another example, more typical since it assumes more than one use.
   CompiledCalculationBase base=(CompiledCalculationBase) Class.forName (className).newInstance( );
2. Instantiate a SimpleCalculationInput.
   SimpleCalculationInput input=new SimpleCalculationInput( );
3. Set any continuous variable values on the input. To set the continuous variable value, you need to know the UNID. If you do not know it, query the compiled rating base, as in the first line below. Then set the value, as in the second line.
   int contUNID=base.getUNIDForContinuousVariable ("Age");
   input.setValueForContinuousVariable (contUNID, 25.0);
4. Set any date variable values on the input. To set the date variable value, you need to know the UNID of the date variable. If you do not know it, query the compiled rating base, as in the first line below. Then set the value, as in the second line.
   int dateUNID=base.getUNIDForDateVariable ("MaturityDate");
   input.setValueForDateVariable (dateUNID, new Date ("Dec. 31, 2010"));
5. Set any discrete variables on the input. Again, you need to know the UNID, but here you do not set values.
   int discUNID=base.getUNIDForDiscreteVariable ("IL");
   input.setDiscreteVariable (discUNID);
6. Set the calculation date on the input. If you don't do this, the calculation date defaults to the time at which the SimpleCalculationInput was instantiated.
   input.setCalculationDate (new Date ("Jan. 31, 2000").
7. If the input requires any child inputs, instantiate and create them as well, using the same techniques as in steps 2-6. Then, bind them as child inputs, using setChildrenOfType. The child inputs are bound with a type, which will determine which child inputs get enumerated in a given loop step.
   Vector children=new Vector( );
   //create a bunch of child inputs and put them in the children Vector
   input.setChildrenOfType ("people", children);
8. Instantiate a SimpleCalculationOutput
   SimpleCalculationOutput output=new SimpleCalculationOutput( );
9. Instantiate RuntimePreferences.
   RuntimePreferences prefs=new RuntimePreferences( );
   Set any appropriate runtime preferences for such things as logging options, overrides, and file locations.
10. Call Calculate on the calculation base, giving as arguments the methodology name, the input, the output, and the preferences. If any warning steps are triggered, the warnings they generate will be returned as a vector.
    Vector warnings=base.Calculate ("MyMethodology", input, output, prefs);
11. Query the output for the results. To query the output, you need to know the UNID of the step or steps whose value or result you wish to know. If you do not know the UNID, query the compiled rating base as in the example below.
    int stepUNID=base.getUNIDForStep ("FinalResult");
    Double finalResult=output.getResultForStep (stepUNID);
    Double finalValue=output.getValueForStep (stepUNID);

Other Embodiments

While the invention has been described with reference to various embodiments, it will be understood that these embodiments are illustrative and that the scope of the invention is not limited to them. Many variations, modifications, additions, and improvements are possible. For example, although XML and Java-based encodings are described, other forms for calculation base, intermediate source and compiled rating models are also suitable. In addition, while two-step compilation (XML to Java source to Java byte codes) is described, other compilation configurations are also possible. More generally, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Structures and functionality presented as discrete components in the exemplary configurations may be implemented as a combined structure or component. These and other variations, modifications, additions, and improvements may fall within the scope of the invention as defined in the claims that follow.

APPENDIX A

```
import java.util.*;
public final class ExampleDiscreteVarMeta implements
java.io.Serializable
{
    private static final Hashtable discreteVarTable = new Hashtable ( );
    private static final Hashtable discreteVarNameTable = new
        Hashtable ( );
    private static final Hashtable discreteVarByParentUNIDTable = new
        Hashtable ( );
    private static final Hashtable discreteVarParentTable = new
        Hashtable ( );
    static private class Names0 {
        static final String names [ ] = {
            "root", "Status", "Retiree", "Active", "Gender", "Male",
            "Female", "ContractState", "AB", "AK", "AL", "AR", "AZ",
            "BC", "CA", "CA1", "CA2", "CO", "CT", "DC", "DE", "FL",
            "GA", "GU", "HI", "IA", "ID", "IL", "IN", "KS", "KY", "LA",
            "MA", "MB", "MD", "ME", "MI", "MN", "MO", "MS", "MT",
            "NB", "NC", "ND", "NE", "NF", "NH", "NJ", "NM", "NS",
            "NT", "NV", "NY", "NY1", "NY2", "OH", "OK", "ON",
            "OR", "PA", "PE", "PQ", "PR", "RI", "SC", "SD",
            "SK", "TN", "TX", "UT", "VA", "VI", "VT",
            "WA", "WI", "WV", "WY", "YT", "VolumeType",
            "CensusVolumeUnaltered", "CensusVolumeInParameters",
            "PlanType", "MultipleEarnings", "FlatAmt",
            "MultipleEarnings_FlatAmt", "ScheduleType", "Sched1",
            "Sched2", "Sched3", "Sched4","Sched5", "Sched6", "Sched7",
            "Sched8", "Sched9", "Sched10", "Sched11",
            "CollectiveBargained", "CollectiveBargainedY",
            "CollectiveBargainedN", "Arrangements", "ArrangementsY",
            "ArrangementsN", "AdminSysDesign", "AdminSysDesignY",
            "AdminSysDesignN", "ClaimControlParticip",
            "ClaimControlParticipY", "ClaimControlParticipN",
            "ClaimAnalysis", "ClaimAnalysisY", "ClaimAnalysisN",
            "BargainConsult", "BargainConsultY", "BargainConsultN",
            "ProvisionReview", "ProvisionReviewY", "ProvisionReviewN",
            "CustSatisfMonitor", "CustSatisfMonitorY",
            "CustSatisfMonitorN", "EnrollAssist", "EnrollAssistY",
            "EnrollAssistN", "MaintainRecords", "MaintainRecordsY",
            "MaintainRecordsN", "PlanDocAssist", "PlanDocAssistY",
            "PlanDocAssistN", "PlanChangeConsult", "PlanChangeConsultY",
            "PlanChangeConsultN", "SupervisingAgent",
            "SupervisingAgentY", "SupervisingAgentN", "FilingRetention",
            "FilingRetentionY", "FilingRetentionN", "ComArrangement",
            "ComArrangementNONE", "ComArrangementLEVEL",
            "ComArrangementFLATPERC", "ComArrangementFLATAMT",
            "HospitalInpatientStay", "HospitalStayStrd",
            "HospitalStayPremium", "OptBenefitPackage",
            "BenefitStrdBundled", "BenefitPremiumBundled",
            "BenefitOfferedUnbundled", "DisabilityProvision",
            "DisabilityStrd", "DisabilityPremium", "NOVAPricing",
            "NOVAPricingY", "OccupationalCoverage", "CoverageY",
            "CoverageN", "PlanRoundingPreferences", "RoundNearestDollar",
            "RoundHigher1000", "RoundNearer1000", "RoundLower1000"} ;
    } ;
    static private class FullNames0 {
        static final String fullNames [ ] = {
            "root", "root/Status", "root/Status/Retiree",
            "root/Status/Active", "root/Gender", "root/Gender/Male",
            "root/Gender/Female", "root/ContractState",
            "root/ContractState/AB", "root/ContractState/AK",
            "root/ContractState/AL", "root/ContractState/AR",
            "root/ContractState/AZ", "root/ContractState/BC",
            "root/ContractState/CA", "root/ContractState/CA1",
            "root/ContractState/CA2", "root/ContractState/CO",
            "root/ContractState/CT", "root/ContractState/DC",
            "root/ContractState/DE", "root/ContractState/FL",
            "root/ContractState/GA", "root/ContractState/GU",
            "root/ContractState/HI", "root/ContractState/IA",
            "root/ContractState/ID", "root/ContractState/IL",
            "root/ContractState/IN", "root/ContractState/KS",
            "root/ContractState/KY", "root/ContractState/LA",
            "root/ContractState/MA", "root/ContractState/MB",
            "root/ContractState/MD", "root/ContractState/ME",
            "root/ContractState/MI", "root/ContractState/MN",
            "root/ContractState/MO", "root/ContractState/MS",
            "root/ContractState/MT", "root/ContractState/NB",
            "root/ContractState/NC", "root/ContractState/ND",
            "root/ContractState/NE", "root/ContractState/NF",
            "root/ContractState/NH", "root/ContractState/NJ",
            "root/ContractState/NM", "root/ContractState/NS",
            "root/ContractState/NT", "root/ContractState/NV",
            "root/ContractState/NY", "root/ContractState/NY1",
            "root/ContractState/NY2", "root/ContractState/OH",
            "root/ContractState/OK", "root/ContractState/ON",
            "root/ContractState/OR", "root/ContractState/PA",
            "root/ContractState/PE", "root/ContractState/PQ",
            "root/ContractState/PR", "root/ContractState/RI",
            "root/ContractState/SC", "root/ContractState/SD",
            "root/ContractState/SK", "root/ContractState/TN",
            "root/ContractState/TX", "root/ContractState/UT",
            "root/ContractState/VA", "root/ContractState/VI",
            "root/ContractState/VT", "root/ContractState/WA",
            "root/ContractState/WI", "root/ContractState/WV",
            "root/ContractState/WY", "root/ContractState/YT",
            "root/VolumeType", "root/VolumeType/CensusVolumeUnaltered",
            "root/VolumeType/CensusVolumeInParameters", "root/PlanType",
            "root/PlanType/MultipleEarnings", "root/PlanType/FlatAmt",
            "root/PlanType/MultipleEarnings_FlatAmt",
            "root/ScheduleType", "root/ScheduleType/Sched1",
            "root/ScheduleType/Sched2", "root/ScheduleType/Sched3",
            "root/ScheduleType/Sched4", "root/ScheduleType/Sched5",
            "root/ScheduleType/Sched6", "root/ScheduleType/Sched7",
            "root/ScheduleType/Sched8", "root/ScheduleType/Sched9",
            "root/ScheduleType/Sched10", "root/ScheduleType/Sched11",
            "root/CollectiveBargained",
            "root/CollectiveBargained/CollectiveBargainedY",
            "root/CollectiveBargained/CollectiveBargainedN",
            "root/Arrangements", "root/Arrangements/ArrangementsY",
            "root/Arrangements/ArrangementsN", "root/AdminSysDesign",
            "root/AdminSysDesign/AdminSysDesignY",
            "root/AdminSysDesign/AdminSysDesignN",
            "root/ClaimControlParticip",
            "root/ClaimControlParticip/ClaimControlParticipY",
            "root/ClaimControlParticip/ClaimControlParticipN",
            "root/ClaimAnalysis", "root/ClaimAnalysis/ClaimAnalysisY",
            "root/ClaimAnalysis/ClaimAnalysisN", "root/BargainConsult",
            "root/BargainConsult/BargainConsultY",
            "root/BargainConsult/BargainConsultN",
            "root/ProvisionReview",
            "root/ProvisionReview/ProvisionReviewY",
            "root/ProvisionReview/ProvisionReviewN",
            "root/CustSatisfMonitor",
            "root/CustSatisfMonitor/CustSatisfMonitorY",
            "root/CustSatisfMonitor/CustSatisfMonitorN",
            "root/EnrollAssist", "root/EnrollAssist/EnrollAssistY",
            "root/EnrollAssist/EnrollAssistN", "root/MaintainRecords",
            "root/MaintainRecords/MaintainRecordsY",
            "root/MaintainRecords/MaintainRecordsN",
            "root/PlanDocAssist", "root/PlanDocAssist/PlanDocAssistY",
            "root/PlanDocAssist/PlanDocAssistN",
            "root/PlanChangeConsult",
            "root/PlanChangeConsult/PlanChangeConsultY",
            "root/PlanChangeConsult/PlanChangeConsultN",
            "root/SupervisingAgent",
            "root/SupervisingAgent/SupervisingAgentY",
            "root/SupervisingAgent/SupervisingAgentN",
            "root/FilingRetention",
            "root/FilingRetention/FilingRetentionY",
            "root/FilingRetention/FilingRetentionN",
            "root/ComArrangement",
            "root/ComArrangement/ComArrangementNONE",
            "root/ComArrangement/ComArrangementLEVEL",
            "root/ComArrangement/ComArrangementFLATPERC",
            "root/ComArrangement/ComArrangementFLATAMT",
            "root/HospitalInpatientStay",
            "root/HospitalInpatientStay/HospitalStayStrd",
            "root/HospitalInpatientStay/HospitalStayPremium",
            "root/OptBenefitPackage",
            "root/OptBenefitPackage/BenefitStrdBundled",
            "root/OptBenefitPackage/BenefitPremiumBundled",
            "root/OptBenefitPackage/BenefitOfferedUnbundled",
            "root/DisabilityProvision",
            "root/DisabilityProvision/DisabilityStrd",
            "root/DisabilityProvision/DisabilityPremium",
            "root/NOVAPricing", "root/NOVAPricing/NOVAPricingY",
            "root/OccupationalCoverage",
            "root/OccupationalCoverage/CoverageY",
            "root/OccupationalCoverage/CoverageN",
            "root/PlanRoundingPreferences",
```

APPENDIX A-continued

```
      "root/PlanRoundingPreferences/RoundNearestDollar",
      "root/PlanRoundingPreferences/RoundHigher1000",
      "root/PlanRoundingPreferences/RoundNearer1000",
      "root/PlanRoundingPreferences/RoundLower1000" } ;
  } ;
  static private class Unids0 {
    static final int unids [ ] = {
      0, 1, 2, 3, 4, 5, 6, 7, 8, 9, 10, 11, 12, 13, 14, 15, 16, 17,
      18, 19, 20, 21, 22, 23, 24, 25, 26, 27, 28, 29, 30, 31, 32,
      33, 34, 35, 36, 37, 38, 39, 40, 41, 42, 43, 44, 45, 46, 47,
      48, 49, 50, 51, 52, 53, 54, 55, 56, 57, 58, 59, 60, 61, 62,
      63, 64, 65, 66, 67, 68, 69, 70, 71, 72, 73, 74, 75, 76, 77,
      78, 79, 80, 81, 82, 83, 84, 85, 86, 87, 88, 89, 90, 91, 92,
      93, 94, 95, 96, 97, 98, 99, 100, 101, 102, 103, 104, 105,
      106, 107, 108, 109, 110, 111, 112, 113, 114, 115, 116, 117,
      118, 119, 120, 121, 122, 123, 124, 125, 126, 127, 128, 129,
      130, 131, 132, 133, 134, 135, 136, 137, 138, 139, 140, 141,
      142, 143, 144, 145, 146, 147, 148, 149, 150, 151, 152, 153,
      154, 155, 156, 157, 158, 159, 160, 161, 162, 163} ;
  } ;
  static private class ParentUnids0 {
    static final int parentUnids [ ] = {-1, 0, 1, 1, 0, 4, 4, 0, 7,
      7, 7, 7, 7, 7, 7, 7, 7, 7, 7, 7, 7, 7, 7, 7, 7, 7, 7, 7, 7,
      7, 7, 7, 7, 7, 7, 7, 7, 7, 7, 7, 7, 7, 7, 7, 7, 7, 7, 7, 7,
      7, 7, 7, 7, 7, 7, 7, 7, 7, 7, 7, 7, 7, 7, 7, 7, 7, 7, 7, 7,
      7, 7, 7, 7, 7, 7, 7, 7, 7, 0, 78, 78, 0, 81, 81, 81, 0, 85,
      85, 85, 85, 85, 85, 85, 85, 85, 85, 85, 0, 97, 97, 0, 100,
      100, 0, 103, 103, 0, 106, 106, 0, 109, 109, 0, 112, 112, 0,
      115, 115, 0, 118, 118, 0, 121, 121, 0, 124, 124, 0, 127, 127,
      0, 130, 130, 0, 133, 133, 0, 136, 136, 0, 139, 139, 139, 139,
      0, 144, 144, 0, 147, 147, 147, 0, 151, 151, 0, 154, 0, 156,
      156, 0, 159, 159, 159, 159} ;
  } ;
  static
  {
    for (int i = 0;i<Names0.names.length; i++)
    {
      discreteVarTable.put(Names0.names [i], new
        Integer(Unids0.unids [i] ) ) ;
      discreteVarNameTable.put (new
        Integer(Unids0.unids [i] ), FullNames0.fullNames [i] ) ;
      discreteVarTable.put (FullNames0.fullNames [i], new
        Integer(Unids0.unids [i] ) ) ;
      discreteVarByParentUNIDTable.put (Names0.names [i] + " I " +
        ParentUnids0.parentUnids [i], new Integer(Unids0.unids [i] ) ) ;
      discreteVarParentTable.put (new Integer (Unids0.unids [i] ), new
        Integer(ParentUnids0.parentUnids [i] ) ) ;
    }
  }
  public static int getUNIDForDiscreteVariable (String var)
  {
    Integer val = (Integer) discreteVarTable.get(var) ;
    return ( (val = = null) ? –1:val.intValue ( ) ) ;
  }
  public static String getDiscreteVariableForUNID (int UNID)
  {
    return (String) discreteVarNameTable.get (new Integer(UNID ) ) ;
  }
  public static int getUNIDForDiscreteVariableWithParent (String var,
    int parentUNID)
  {
    Integer val = (Integer) discreteVarByParentUNIDTable.get (var +
      " I " + parentUNID) ;
    return ( (val = = null) ? –1:val.intValue ( ) ) ;
  }
  public static int getParentForDiscreteVariable (int UNID)
  {
    Integer val = (Integer) discreteVarParentTable.get (new
      Integer (UNID) );
    return ( (val = = null) ? –1:val.intValue ( ) );
  }
  public static int [ ] getTopLevelDiscreteVariableUNIDS ( )
  {
    int totalVars = 0 ;
    int currentVar = 0 ;
    Enumeration vars = discreteVarParentTable.keys ( );
    while (vars.hasMoreElements ( ) )
    {
      Integer var = (Integer) vars.nextElement ( );
      Integer parent = (Integer) discreteVarParentTable.get (var) ;
      if (parent.intValue ( ) = = –1) totalVars++ ;
    }
    int out [ ] = new int [totalVars] ;
    vars = discreteVarParentTable.keys ( ) ;
    while (vars.hasMoreElements ( ) )
    {
      Integer var = (Integer) vars.nextElement ( ) ;
      Integer parent = (Integer) discreteVarParentTable.get (var) ;
      if (parent.intValue ( ) = = –1) out [currentVar++] =
        var.intValue ( ) ;
    }
    return out ;
  }
  public static int [ ] getDiscreteVariableUNIDSForParent (int
    parentUNID)
  {
    int totalVars = 0 ;
    int currentVar = 0 ;
    Enumeration vars = discreteVarParentTable.keys ( ) ;
    while (vars.hasMoreElements ( ) )
    {
      Integer var = (Integer) vars.nextElement ( ) ;
      Integer parent = (Integer) discreteVarParentTable.get (var) ;
      if (parent.intValue ( ) = = parentUNID) totalVars++ ;
    }
    int out [ ] = new int [totalVars] ;
    vars = discreteVarParentTable.keys ( ) ;
    while (vars.hasMoreElements ( ) )
    {
      Integer var = (Integer) vars.nextElement ( ) ;
      Integer parent = (Integer) discreteVarParentTable.get (var) ;
      if (parent.intValue ( ) = = parentUNID) out [currentVar++] =
        var.intValue ( ) ;
    }
    return out ;
  }
}
```

What is claimed is:

1. A computer implemented method of preparing an executable representation of a rating model, the method comprising:

defining an actuary-manipulable representation of a rating model, the actuary-manipulable representation embodied in computer readable media and encoding therein variables, factor tables and calculation sequences of the rating model, the factor tables having one or more axes bound to respective ones of the variables and the calculation sequences defined in terms of steps operative on values of the variables and cells of the factor tables; and transforming the actuary-manipulable representation to the executable representation, the executable representation embodied in computer readable media and encoding therein resultant computer program code including a runtime lookup facility for identification of runtime identifiers in the executable representation corresponding to ones of the variables and a calculate method executable to generate a quote based on inputs supplied via a predefined input interface, wherein the transforming is performed at least in part by a compiler that executes on a computational machine.

2. The computer implemented method of claim 1, further comprising:

executing the executable representation to calculate a quote for an insurance product.

3. The computer implemented method of claim 2, wherein the rating model defining is performed in accordance with a predefined document type definition.

4. The computer implemented method of claim 2, wherein the transforming to the executable representation includes compilation of the actuary-manipulable representation to a platform independent executable form.

5. The computer implemented method of claim 2, wherein the executable representation includes:
predefined input and output interfaces;
a runtime lookup facility for identification of runtime identifiers in the executable representation corresponding to ones of the variables; and
a calculate method of the compiled rating model executable to generate the quote based on inputs supplied via the input interface.

6. The computer implemented method of claim 5, further comprising:
employing the runtime lookup facility to identify particular runtime identifiers corresponding to particular variables;
setting values for the particular variables using the corresponding runtime identifiers and the predefined input interface; and
retrieving the quote via the predefined output interface.

7. The computer implemented method of claim 2,
wherein the actuary-manipulable representation includes markup language encoded metadata.

8. The computer implemented method of claim 2,
wherein the actuary-manipulable representation is XML encoded.

9. The computer implemented method of claim 2,
wherein the actuary-manipulable representation includes a graphical user interface presentation of the variables, factor tables and computational flows of the rating model based on markup language encoded metadata.

10. The computer implemented method of claim 1, wherein, for a particular calculation sequence retrieved from the computer readable media encoding of the actuary-manipulable representation, the transforming includes:
decomposing the particular calculation sequence encoded therein into layers, each layer including those steps thereof that are at a same flow control level;
for each layer, traversing the steps thereof to identify those of the variables used by the layer;
for each layer, traversing the calculation sequence to identify the steps of the layer targeted by other steps of the calculation sequence and emitting code allocating storage for results of the targeted steps; and
for each layer, emitting code for variable test and index calculations of the layer, wherein the emitted code is stored as part of an in-media computer readable encoding of at least a functional precursor to the resultant computer program code.

11. The computer implemented method of claim 1, wherein the transforming includes:
emitting, for a particular calculation sequence, both logged and non-logged versions of the executable representation and encoding computer program code.

12. The computer implemented method of claim 1,
wherein the transforming includes a two-step compilation,
a first step thereof producing a platform independent source form from the actuary-manipulable representation, and
a second step thereof producing the executable representation from the platform independent source form and encoding same as the resultant computer program code.

13. The computer implemented method of claim 1,
wherein the runtime lookup facility of the executable representation includes in the resultant computer program code a predefined interface for obtaining the runtime identifiers corresponding to respective ones of the variables and factor tables of the rating model; and
wherein, upon execution of the resultant computer program code, the runtime identifiers allow client code to set and access runtime storage corresponding to respective ones of the variables and factor tables.

14. The computer implemented method of claim 13,
wherein the client code is part of a networked information service; and
wherein the resultant computer program code is supplied for execution on a target computational machine that hosts the networked information service to prepare a quote for presentation thereby.

15. The computer implemented method of claim 1, wherein the computational machine on which the transforming is performed includes:
a processor that hosts an executable instance of program code executable thereon as the compiler; and
storage accessible to the processor constituting the computer readable media in which the actuary-manipulable representation of the rating model and the resultant program code of the executable representation are respectively encoded.

16. A computer program product comprising computer readable media having computer readable program code embodied therein, the computer readable program code adapted to be executed as:
a compiled rating model corresponding to a calculation base including variables, factor tables and calculation sequences thereof, wherein one or more axes of the factor tables are bound to respective ones of the variables, and wherein the calculation sequences are defined in terms of steps operative on values of the variables and cells of the factor tables;
a lookup facility to identify runtime identifiers corresponding to runtime instances of the variables;
an input interface including access methods for setting values for the runtime instances of the variables using the corresponding runtime identifiers; and
a calculate method of the compiled rating model executable to generate result of the calculation sequences based on the set values.

17. The computer program product of claim 16,
wherein the runtime identifiers allow client code to employ the compiled rating model without knowledge of internals thereof.

18. The computer program product of claim 17,
wherein the client code is a component of a networked information service; and
wherein the networked information service sets values for the runtime instances of the variables and invokes the calculate method of the compiled rating model to generate a quote based thereon.

19. A system comprising:
a processor that hosts an executable instance of program code, including a compiler, for transforming an actuary-manipulable representation of a rating model into an executable representation thereof; and
storage accessible to the processor constituting computer readable media for encoding of the actuary-manipulable representation and, based on operations performed thereon at least in part using the compiler, for encoding the executable representation transformed from the actuary-manipulable representation;
the actuary-manipulable representation embodied in the computer readable media and encoding therein variables, factor tables and calculation sequences of the rating model, the factor tables having one or more axes bound to respective ones of the variables and the calculation sequences defined in terms of steps operative on values of the variables and cells of the factor tables, and the executable representation embodied in the computer readable media and encoding therein resultant computer program code including a runtime lookup facility for identification of runtime identifiers in the executable representation corresponding to ones of the variables and a calculate method executable to generate a quote based on inputs supplied via a predefined input interface.

20. The system of claim 19, further comprising:
a target computational machine that receives a compiled instance of the resultant computer program code from the storage and that executes the resultant computer program code to generate the quote based on inputs supplied via the predefined input interface.

* * * * *